United States Patent [19]

Handleman

[11] 4,186,772
[45] Feb. 5, 1980

[54] EDUCTOR-MIXER SYSTEM

[76] Inventor: Avrom R. Handleman, P.O. Box 13151, St. Louis, Mo. 63119

[21] Appl. No.: 801,620

[22] Filed: May 31, 1977

[51] Int. Cl.[2] .................................. F16K 19/00
[52] U.S. Cl. .......................... 137/604; 406/153; 417/197
[58] Field of Search .................. 137/604; 302/25; 417/167, 178, 177, 181, 197, 198

[56] References Cited

U.S. PATENT DOCUMENTS

| 992,144 | 5/1911 | Babcock | 417/197 X |
|---|---|---|---|
| 1,116,971 | 11/1914 | Barker | 302/25 X |
| 1,458,523 | 6/1923 | Coutant | 417/197 X |
| 1,724,625 | 8/1929 | Sweeny | 417/197 X |
| 1,806,287 | 5/1931 | Forrest | 417/197 X |
| 1,901,797 | 3/1933 | Black | 417/197 |
| 2,100,185 | 11/1937 | Engstrand | 417/197 X |
| 2,310,265 | 2/1943 | Sweeny | |
| 2,695,265 | 11/1954 | Degnen | |
| 2,722,372 | 11/1955 | Edwards | |
| 3,152,839 | 10/1964 | Edwards | 302/25 |
| 3,166,020 | 1/1965 | Cook | |
| 3,175,515 | 3/1965 | Cheely | 417/197 |
| 3,186,769 | 6/1965 | Howlett | |
| 3,276,821 | 10/1966 | Edwards | 302/25 |
| 3,368,849 | 2/1968 | Cheely | 302/25 X |
| 3,720,482 | 3/1973 | Tell | 417/197 X |
| 3,777,775 | 12/1973 | Handleman | 137/268 |
| 4,007,694 | 2/1977 | Fowler | |
| 4,055,870 | 11/1977 | Furutsutsumi | 417/197 X |

FOREIGN PATENT DOCUMENTS 780113 3/1968 Canada.

OTHER PUBLICATIONS

ASME Paper No. 74-FE-18, Journal of Fluids Engineering, R.G. Cunningham, "Gas Compression with the Liquid Jet Pump".
ASM Paper No. 74-FE-17, Journal of Fluids Engineering, R. G. Cunningham and R. J. Dopkin, "Jet Breakup and Mixing Lengths for the Liquid Jet Gas Pump".

Primary Examiner—Robert G. Nilson
Attorney, Agent, or Firm—Koenig, Senniger, Powers and Leavitt

[57] ABSTRACT

An eductor-mixer system in which pressurized working fluid is discharged through a nozzle as a concentric, high speed jet flowing past the end of an inlet tube into a mixing chamber for generating a vacuum thereby to positively draw a pressure transportable material through the inlet tube and into the mixing chamber and for mixing with the working fluid to form a dispersion with the walls of the mixing chamber being spaced from the projected path of the jet. A bypass is disclosed for the flow of pressurized working fluid around the nozzle thereby to control the amount of material drawn into the eductor-mixer. A recycle system is also disclosed which withdraws a portion of the mixed dispersion and recirculates it through the nozzle for shearing as it passes through the nozzle. Additional material and/or working fluid may be added so as to vary the concentration level or quality of the resulting dispersion.

6 Claims, 7 Drawing Figures

EDUCTOR-MIXER SYSTEM

BACKGROUND OF THE INVENTION

This invention relates to an eductor-mixer system particularly adapted for the preparation of dispersions, solutions and slurries. More particularly, the eductor-mixer system of this invention is an improvement over the eductor-mixer system disclosed in my prior U.S. Pat. No. 3,777,775.

An eductor-mixer system is well suited to continuously mix a solute (e.g., a powder, particulate, or other pressure transportable or fluidizable material, a liquid or a gas) and a solvent or working fluid (e.g., a liquid or in some instances a gas) to form a dispersion, slurry or solution. The eductor-mixer system of the present invention is especially adapted for use with readily transportable containers, such as is shown in the above-noted patent and in U.S. Pat. No. 4,007,694, in which a "semi-bulk" quantity (e.g., 500–4,000 pounds or more) of powder or other solute material is stored and transported and in which the load may be fluidized for ready discharge to the eductor-mixer system. These containers are commercially available under the registered trademark AIR PALLET from Semi-Bulk Systems, Inc. of St. Louis, Mo. The solute inlet of the above-mentioned eductor-mixer system is conventionally connected to the discharge outlet of the fluidized container so that the vacuum generated within the eductor-mixer by the flow of solvent (water) therethrough cooperates with the fluidized discharge of the powder from the container to positively draw the fluidized powder into the eductor-mixer.

In certain applications, such as in the use of fire retardants for fighting forest fires, it is often necessary to rapidly unload thousands of pounds of powdered fire retardant solute material and to mix it in proper proportion with water to form a slurry or solution for application to the fire. In many known prior art eductor-mixer systems, the powder supply, even if it were a fluidized container, was required to be located above the level of the eductor-mixer system because the latter was dependent on the gravity feed of the powder. In the system shown in the above-mentioned U.S. Pat. No. 3,777,775, the eductor-mixer system was not dependent upon gravity feed because the vacuum within the eductor-mixer positively drew the powder from the container into the eductor-mixer system and thus the system shown in the above-mentioned patent was not dependent on the relative location of the powder container and the eductor-mixer system. However, the eductor-mixer system shown in the above-mentioned patent was thought to be somewhat complex in that it utilized two stages or nozzles and it was not as efficient as was theoretically possible in generating the vacuum which positively drew the solute thereinto.

When eductor-mixers are utilized to mix abrasive powders, they are subject to destructive internal wear caused by the flow of the abrasive powder and resulting slurry within the eductor. It has been difficult to make adjustments within the eductor to compensate for wear and to accommodate different flow rates of solute and solvent through the eductor.

In many prior eductor-mixers which are used to mix a powdered solute with a liquid solvent, it has been heretofore difficult to control the flow of the powdered solute into the eductor. This was usually accomplished by a throttling valve in the solute inlet line or at the bottom of the hopper feeding the eductor-mixer with powder. This throttling valve, however, was often unsatisfactory for controlling the flow of solute in continuous operations. As shown in the coassigned U.S. Pat. No. 3,777,775, solute flow control has been achieved by providing an air bleed valve in the solute inlet line thus allowing air to enter the line and to regulate the vacuum generated within the eductor-mixer. In some instances, however, this air bleed control was not an altogether satisfactory way to control the flow of solute to the eductor-mixer.

In mixing certain solutions and solvents, it has heretofore been a problem to break up agglomerates (i.e., globules or lumps) of powder or to reduce the size of powder particles and to disperse the powder in a solvent. For example, in mixing paint pigment with a solvent, it was heretofore necessary to mechanically mix batches of the pigment and solvent in a Cowles-type blender or the like for several hours or even several days to break up and wet agglomerates of the pigment with the solvent and to uniformly disperse the pigment in the solvent.

In certain prior eductor-mixer systems, it was not possible to mix certain solute and solvent mixtures in sufficient proportion to form slurries or solutions of desired concentration levels.

Reference may be made to U.S. Pat. Nos. 1,806,287, 2,100,185, 2,310,265, 2,695,265, 2,772,372, 3,166,020, 3,186,769 and to Canadian Pat. No. 790,113 which disclose various eductor-mixer mixing systems, and air conveying apparatus in the same general field as the present invention.

SUMMARY OF THE INVENTION

Among the several objects and features of this invention may be noted the provision of an eductor-mixer system particularly well suited for either continuous or batch preparation of dispersions, solutions, or slurries from a fine granular, particulate, or powdered solute or other pressure transportable or fluidizable material and a working fluid or solvent; the provision of such an eductor-mixer system which is also capable of mixing gas or vapor solutes with liquid or gaseous working fluids; the provision of such an eductor-mixer system which thoroughly mixes the solute and working fluid; the provision of such an eductor-mixer system which is self-flushing and which effectively prevents back flow of the working fluid into the solute inlet; the provision of such an eductor-mixer system which minimizes the flow losses therethrough and which is highly efficient in transferring momentum from the working fluid to the solute and to the resulting dispersion; the provision of such an eductor-mixer system in which relatively high vaccum levels may be efficiently generated therewithin so as to positively draw or suck fluidizable material into the eductor-mixer system and so that the relative location of the eductor-mixer system and the fluidizable material supply is much less critical; the provision of such an eductor-mixer system which may be advantageously used to dissolve a gas in a liquid in such processes as oxygenation of a liquid; the provision of such an eductor-mixer system in which the flow of dry powder solute to the eductor-mixer system may readily be controlled; the provision of such an eductor-mixer system which has relatively few parts and which can be readily disassembled and assembled for cleaning and repairs; the provision of such an eductor-mixer system in which certain parts subject to flow erosion may be readily and inexpensively replaced and may be adjusted relative to one another to compensate for wear so as to lengthen the service life while maintaining the desired flow characteristics through the eductor-mixer; the provision of such an eductor-mixer system in which certain parts thereof may be readily changed so as to vary the flow rate through the eductor-mixer system within a predetermined range; and the provision of such an eductor-mixer system which is of relatively simple and rugged construction, which is reliable in operation, and which requires no special training or skill for use.

In general, an eductor-mixer system of this invention comprises an eductor body having a curved passage extending therethrough for flow of a pressurized working fluid from one end of the passage, constituting an inlet end, to the other end of the passage, constituting a discharge end, the passage being generally of uniform circular cross-section throughout its length. The body has an opening therein opposite the discharge end of the passage, said opening being coaxial with said discharge end and of substantially smaller diameter than the diameter of said passage. A nozzle member comprising a ring separate from the body having inside and outside faces and a central opening therethrough from its inside to its outside face is removably mounted in place at the discharge end of said passage coaxial with said discharge end, said central opening in the ring being of substantially smaller diameter than the diameter of said passage. A cylindrical tube of substantially smaller diameter than the diameter of said passage extends from outside said body through said opening in the body opposite the discharge end of the passage and extends forward in said passage from the inner end of said opening in the body into the central opening in the ring, said tube being open at its end in said central opening in the ring, said open end of the tube constituting a discharge end. The tube is axially adjustable in and removable from said opening, and is adapted for connection of its end outside the body to a source of fluent material to be educted and mixed with said working fluid for flow of said material through said tube and out of the discharge end of the tube. The discharge end of the tube is substantially flush with the outside face of said ring, and the tube is exteriorly tapered at its said discharge end and thereby has an exterior conical surface convergent in the direction toward its said discharge end with the angle of taper with respect to the axis of the tube less than about 30°. The inner periphery of the ring bounding the central opening in the ring is formed as a conical nozzle surface extending from the inside face to the outside face of the ring and convergent in downstream direction from the inside to the outside face of the ring, said conical nozzle surface of the ring surrounding and being spaced from said exterior conical surface of the tube a distance which is small relative to diameter of the outer end of said conical nozzle surface, thereby providing an annular conical orifice between the exterior conical surface of the tube and said conical nozzle surface of the ring for delivery of the pressurized working fluid from said passage through said orifice in the form of a hollow conical jet converging in downstream direction from the outside face of the ring. The gap between the exterior conical surface of the tube and the conical nozzle surface of the ring is relatively small and the length of said orifice is relatively short for rapid acceleration of working fluid flowing through the orifice to a relatively high lineal velocity with low flow losses. Means separate from the ring providing a passage downstream from said ring at the discharge end of the passage in said body in which the material issuing from the discharge end of the tube and the working fluid conically jetted through said orifice may mix is removably secured to said body at the discharge end of the passage in the body extending outwardly from said ring and having an external diameter at its end at the outside face of said ring larger than the diameter of said conical nozzle surface of the ring at the outside face of the ring and the internal surface of said passage means lying outward of and wholly clear of the projection of said conical jet throughout the length of the jet.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 7:
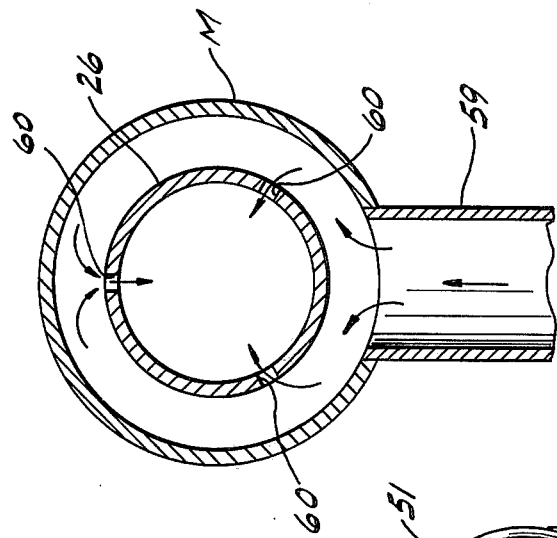
FIG. 7 is a cross-sectional view taken on line 7—7 of FIG. 4.

Referring now to the drawings, an eductor-mixer of this invention, indicated in its entirety at 1, is shown to comprise an eductor body or housing 3 having a curved passage therethrough for a working fluid or solvent from an inlet 5 at one end of the passage (also referred to as a first inlet) adapted to be connected to a source of pressurized working fluid or solvent (e.g., to a liquid line or a pump) to the other end of the passage, constituting a discharge end, and a second inlet 7 adapted to be connected to a supply of pressure transportable or fluidizable material (also referred to herein as a solute or fluent material). The passage is generally of uniform circular cross-section throughout its length. The eductor-mixer system is an improvement over the eductor-mixer system shown in said U.S. Pat. No. 3,777,775. As mentioned above, the solvent inlet may be connected to the discharge side of a liquid pump (see FIG. 5) or other source of pressurized working fluid. Inlet 7 may be connected via an appropriate hose to the discharge opening of a fluidized container, such as is shown in the above-mentioned U.S. Pat. Nos. 3,777,775 and 4,007,694. These fluidized containers are commercially available from Semi-Bulk Systems, Inc. of St. Louis, Mo. under their registered trademark AIR PALLET. These AIR PALLET containers are used in transporting and storing "semi-bulk" quantities (e.g., more than a bagfull and less than a truck or railroad car full) of powdered, fine granular, particulate, or other fluent or fluidizable material, such as powdered fire retardant materials, paint pigments, cement, oil well drilling muds, diatomaceous earth, talc, lime, etc. It is often necessary to mix the powdered solute with a solvent upon unloading of the solute to form a dispersion, slurry or solution. While the eductor-mixer system of this invention described and claimed hereinafter will be referred to primarily in conjunction with the above-mentioned AIR PALLET fluidized containers for mixing powdered solutes with liquid solvents, it will be understood that the eductor mixer system of this invention need not be used in conjunction with an AIR PALLET container and it may be used to mix all types of solutes and solvents. It will be particularly understood that the eductor-mixer system of this invention may be used to mix both liquid and gaseous solvents and solutes.

Figure 1:
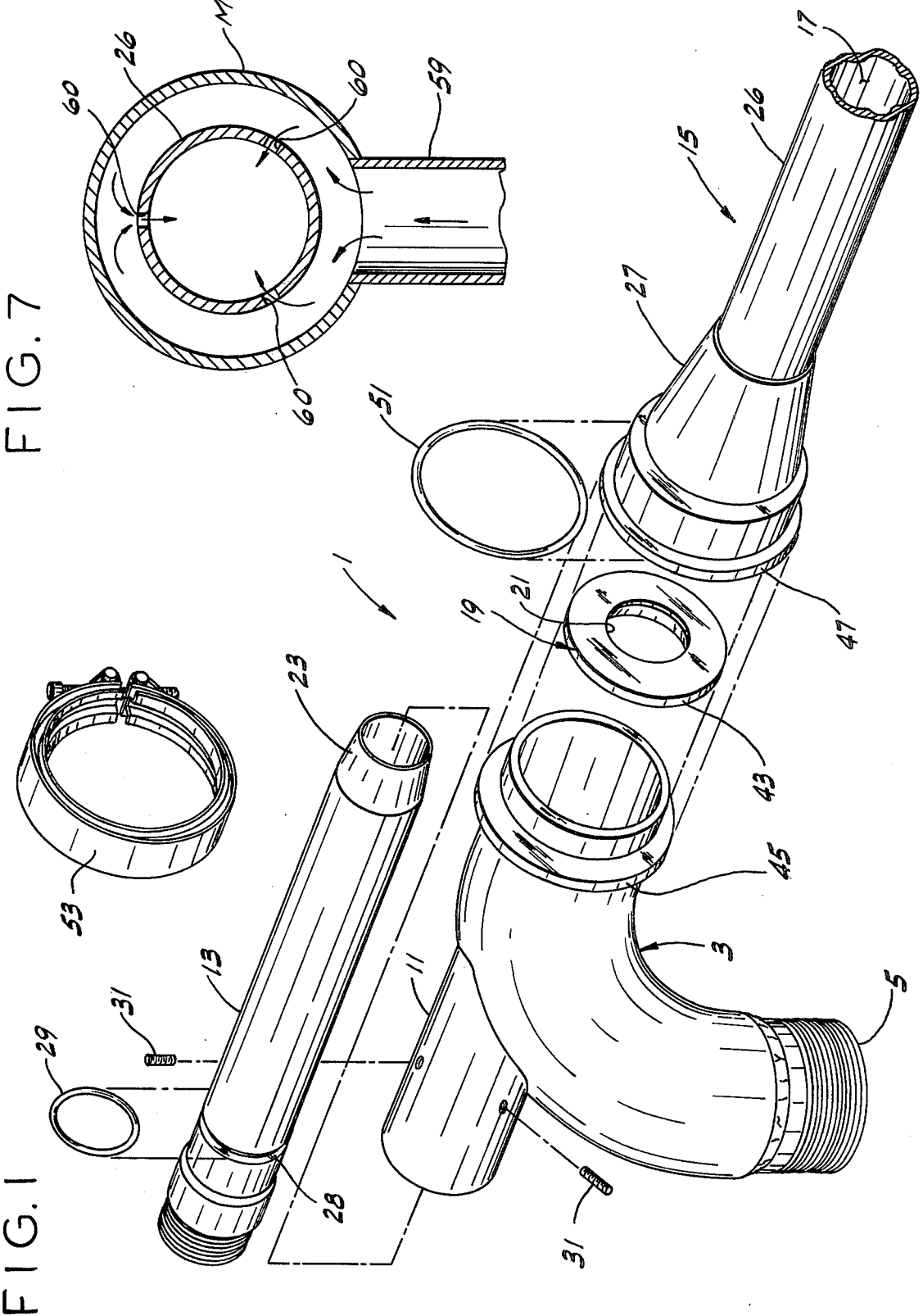
FIG. 1 is an exploded perspective view of an eductor-mixer of this invention.
Figure 2:
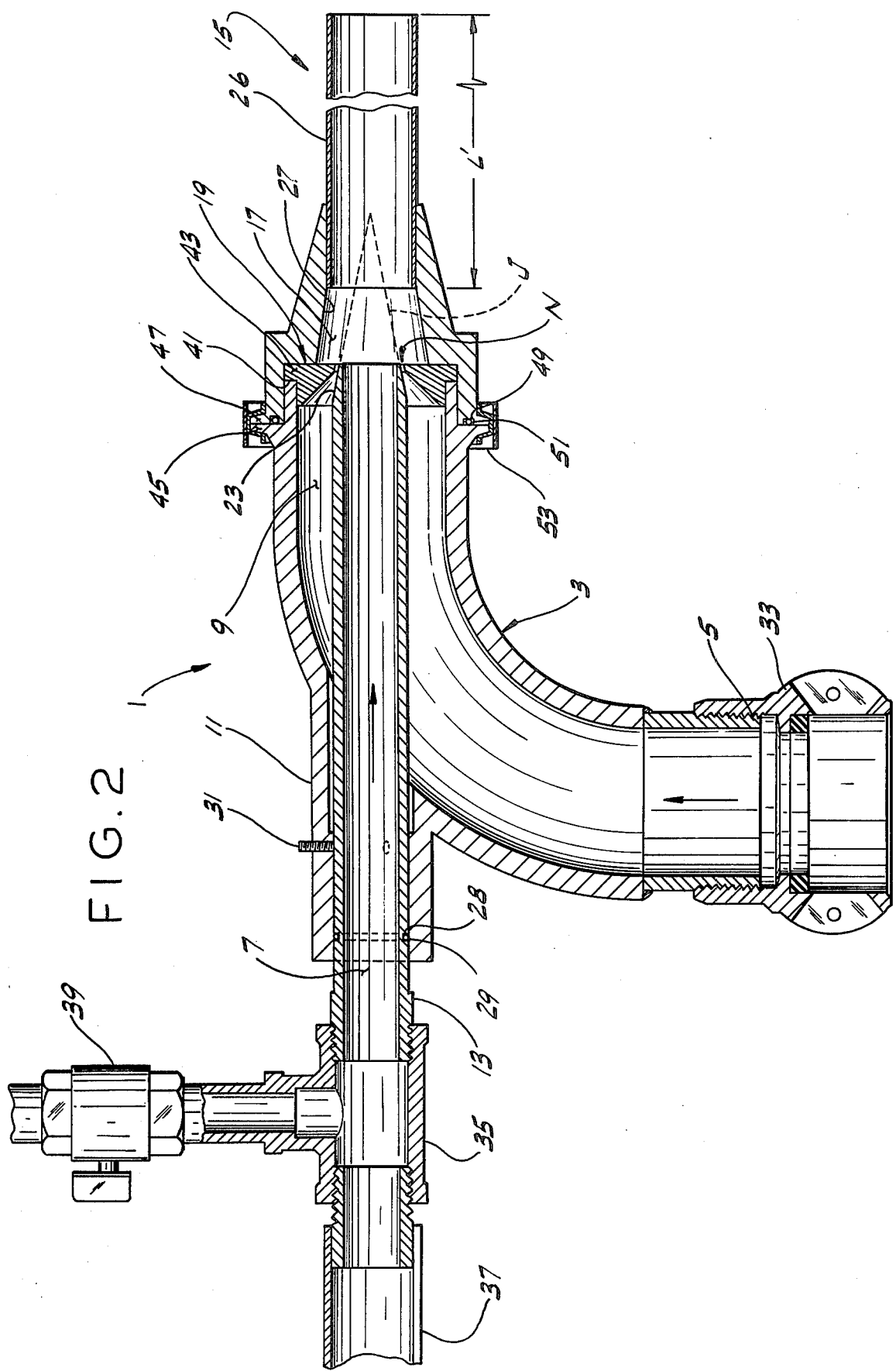
FIG. 2 is a longitudinal cross-sectional view of the eductor-mixer.

Referring now to FIGS. 1 and 2, the body or housing 3 of the eductor-mixer system of this invention is preferably cast or fabricated of a suitable metal, such as stainless steel, and has the passage or plenum chamber 9 formed therewithin in communication with solvent inlet 5. A sleeve 11 extends from the housing coaxial with the discharge end of the passage. It will be understood, however, that sleeve 11 could extend internally into housing 3. While housing 3 is shown to be generally in the shape of a 90° pipe elbow, it will be understood that the housing may assume other shapes and still be in the scope of the invention. Solute inlet 7 is shown to comprise a cylindrical tube 13 of somewhat smaller diameter than the bore of sleeve 11. Tube 13 is insertable into the sleeve so as to extend through plenum chamber or passage 9 with the pressurized working fluid or solvent filling the plenum chamber or passage and surrounding the solute inlet tube. A receiving member or passage means, generally indicated at 15, is removably secured to housing 3. The interior of this receiving member constitutes a mixing chamber or passage means 17 in which the solute is dispersed in the solvent and in which the solute and solvent are mixed. A nozzle member 19 is disposed within housing 3 at the discharge end of the passage or chamber 9 between chamber 9 and mixing chamber 17. This nozzle member is shown to be a flat ring having a central or nozzle opening 21 therein which receives the inner or discharge end of solute tube 13. The nozzle opening 21 is somewhat larger than the outer diameter of the discharge end of the solute tube and the latter is substantially centered within the opening 21 thereby to define an annular nozzle opening or orifice N through which working fluid under pressure in plenum chamber or passage 9 is discharged at high velocity into the receiving member 15. The solvent is discharged as a concentric, converging hollow jet J and it generates a vacuum within the mixing chamber. The vacuum is in communication with the discharge end of solute tube 13 and thus positively draws or sucks the solute into mixing chamber 17.

Figure 3:
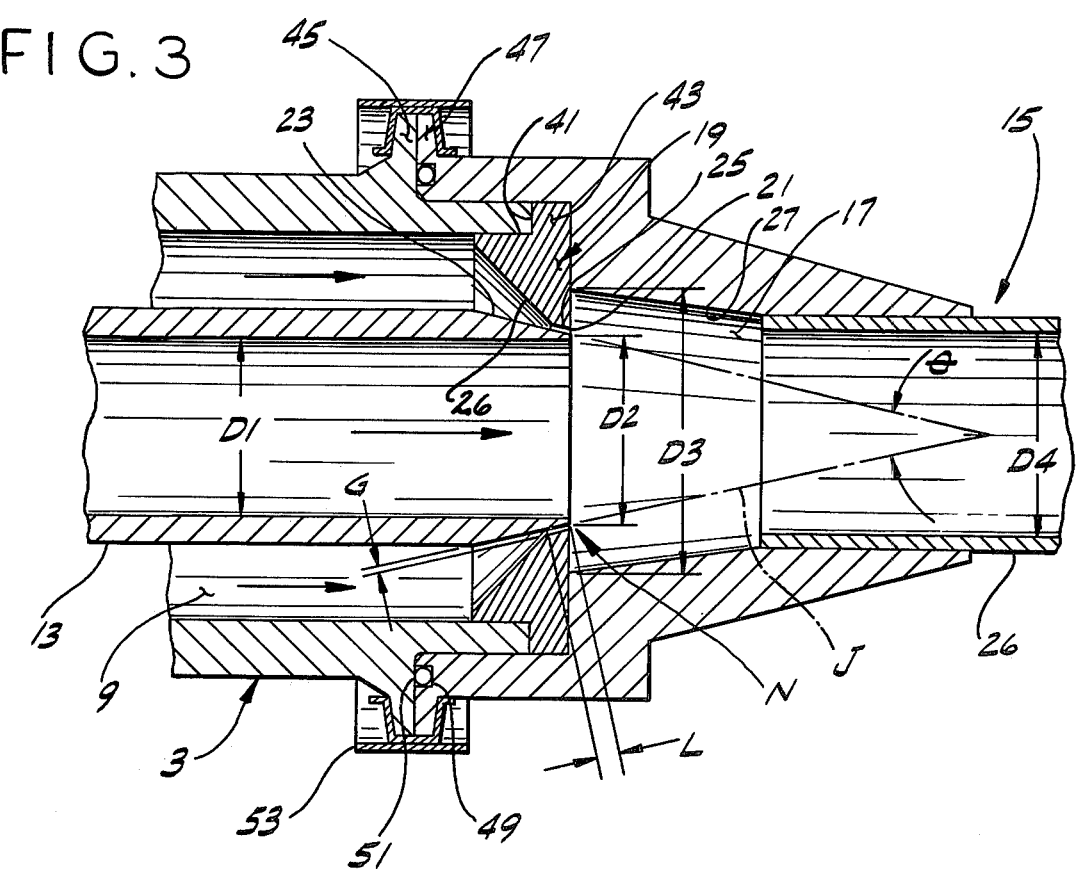
FIG. 3 is an enlarged cross-sectional view of a portion of the eductor-mixer illustrating certain details of the eductor nozzle.

As best shown in FIG. 3, solute tube 13 is of substantially smaller diameter than passage 9 and is exteriorly tapered at its discharge end, thereby having an exterior conical surface 23 at its discharge end with the taper angle $\theta$ of this surface relative to the longitudinal center line of the tube ranging between about 1° and 30° and preferably ranging between about 5° and 15°. Nozzle member 19 has an inner conical nozzle surface 25 which defines its central opening 21. The nozzle member or ring 19, at its inside face (toward the left in FIGS. 2 and 3), has a conical surface 26 converging toward the conical nozzle surface 25. The latter extends from the small end of the conical surface 26 to the outside face (toward the right in FIGS. 2 and 3) of the ring. The diameter of opening 21 and the length of nozzle surface 25 in the direction of flow through the nozzle depend on the desired flow conditions through the nozzle. It will be appreciated that the flow rate through the nozzle is similarly a function of the pressure within plenum chamber or passage 9 and mixing chamber 17 and the flow area of nozzle N. The latter is the cross-sectional area of the gap G between conical surface 23 of the solute tube and the conical nozzle surface 25. The vacuum generated by the jet discharged from the nozzle into the mixing chamber is dependent in part upon the velocity of the jet.

The eductor-mixer 1 of this invention is particularly well suited to efficiently accelerate the working fluid from plenum chamber or passage 9 into the mixing chamber 17 in at least two important ways. First, the cross-sectional area of the plenum chamber or passage is quite large in relation to the cross-sectional area of nozzle N. This allows working fluid to flow through the passage at a speed much slower than it flows through the nozzle so that there is little or no energy lost by the flow of the working fluid through the passage. The length L of the nozzle in the direction of the flow therethrough is relatively quite short. This permits the solvent to be almost instantaneously accelerated to its discharge velocity in a short distance thus minimizing the flow losses while flowing through and discharging from the nozzle at high lineal velocity. At one extreme, nozzle surface 25 may be a sharp knife edge having an extremely short effective length L (e.g., a few thousandths of an inch) in the direction of flow through the nozzle. In other instances, the nozzle surface may preferably have longer length L for purposes that will appear. It will be understood that as the nozzle length L increases, shear (and related energy loss) in the nozzle is increased. Shear, of course, is greater with narrower nozzle gaps. Under most operating conditions, it has been found that the diameter D1 of the outlet end of the solute tube 13 should approach the diameter of the solute feed conduit 37 as will be hereinafter discussed. For example, in eductors through which pass about 500 gallons per minute of solvent (e.g., water) diameter D1 is about 2.4 inches (6.1 cm.) and the diameter of the solute feed conduit is about 2.5 inches (6.0 cm.). Gap G is sized to permit desired or available working fluid flow rates at pressure drops across the gap (e.g., 30–200 psig) to sufficiently accelerate the working fluid to produce a desired working vacuum.

It has also been found that the ratio of the nozzle length L to the gap thickness G (i.e., L/G) preferably should range between about 0.001 for a knife edge surface 23 and up to about 10 for a conical nozzle surface 25 which is generally parallel to the exterior conical surface 23 on tube 13. It will be understood that while surfaces 23 and 25 are shown to be parallel and while in some instances this may be preferred so as to insure that solvent jet J is well defined and is directed into the mixing chamber in a converging cone generally parallel to tapered surface 23, it is not essential to this invention that these surfaces be parallel.

As shown in FIGS. 2 and 3, receiving member 15 comprises a constant-diameter discharge conduit 26 with a transition section 27 positioned between nozzle member 19 and conduit 26. The diameter D3 of the inner end or bore of the transition section is appreciably larger than the diameter D2 of nozzle opening 21.

The third way in which the eductor-mixer system of this invention minimizes energy losses is that the internal surface of transition section 27 between nozzle N and the conduit 26 lies outward of and is wholly clear of the projected path of the converging jet J (as indicated by the dotted lines in FIG. 3) as the jet is discharged from the nozzle and as the jet converges on itself in the mixing chamber. This insures that frictional wall losses along the mixing chamber walls are minimized as it flows at high speeds into the mixing chamber. Further, the diameter of the transition section at any point therealong is larger than the diameter of the projected path of the converging jet so as to insure that the walls of the transition section are clear of the jet. In accordance with this invention, the cross-sectional area of discharge conduit 26 downwstream from mixing chamber 17 is about 3 to 7 times the cross-sectional area of nozzle gap G.

It will be understood that in operation jet J of working fluid converges on the stream of fluidizable material discharged from inlet tube 13 into mixing chamber 17 thereby initiating mixing of the working fluid and the material. The working fluid and the material move at high velocity through the mixing chamber (i.e., through the interior of transition section 27 and conduit 26) thus maintaining a relatively high vacuum. As the working fluid and material enter conduit 26, mixing is even further enhanced and mixing continues substantially along the length of the conduit.

As an example of the efficiency of the eductor-mixer 1 of the present invention in transferring momentum of the working fluid jet to the dispersion within the mixing chamber, an eductor-mixer in accordance with this invention so sized as to have a pressure drop of 40 psi across the nozzle generates a partial vacuum within mixing chamber 17 and within solute tube 13 which has been measured to exceed 28 inches (710 millibars) of mercury when solute tube 13 is closed, and more than 24 inches (610 millibars) of mercury when solute is flowing. This high vacuum positively sucks airborne (fluidized) powdered solute out of one of the above-described fluidized containers at high flow rates. For example, an eductor-mixer system of this invention sized to have 500 gallons (1892 l.) per minute of water pumped therethrough at 30 psig will draw about 1000 lbs. (450 kg.) of a powered solute, such as barite, through an eductor-mixer system in about 1 minute. The vacuum generated by the educator-mixer system 1 of this invention is even more efficient than the prior art eductor-mixer system shown in the above U.S. Pat. No. 3,777,775 in postively drawing the solute into the eductor-mixer system. Thus, the eductor-mixer system of this invention is able to be vertically displaced from the level of the powdered solute in the solute fluidized container a greater distance than had been heretofore possible thereby making the relative location of the eductor-mixer system and the solute supply even less critical.

It will be understood that the surfaces 23 and 25 on the solute tube and nozzle member, respectively, may be hardened (e.g., carburized or nitrided) to provide a hard wear-resistant surface for resisting flow wear abrasion by the solvent and solute flowing therethrough at high speeds. It will also be understood that, alternatively, these surfaces may be hardened by making them of a special material which resists flow wear abrasion.

As heretofore described, solute tube 13 extends into housing 3 through sleeve 11 with the sleeve having an inside diameter slightly greater than the outside diameter of the solute tube. The latter has one or more circumferential grooves 28 for receiving an O-ring seal 29 which in turn seals the solute tube relative to the bore of the sleeve when the former is axially inserted into the latter. This seal permits the solute tube to be moved axially in and out of the sleeve while remaining sealed relative thereto. As is best shown in FIG. 2, the sleeve 11 is substantially coaxial with nozzle opening 21 in nozzle member 19 and with mixing tube 15. Preferably, solute tube 13 is inserted into housing 3 via sleeve 11 and through plenum 9 so that the discharge end of the tube is generally coplanar with the downstream end of nozzle surface 25 and is coaxial with nozzle opening 21 so that the nozzle gap G is of uniform thickness all around the tube and so that the solvent in the plenum surrounds the solute tube. A plurality (e.g., three) of threaded fasteners 31 is threadably carried by sleeve 11 for engagement with the outer surface of solute tube 13. With all of the fasteners 31 engaging the outer surface of tube 13, the tube is firmly secured in place relative to the sleeve at any desired axial position within the sleeve. By adjusting the various fasteners 31 in and out, the end of the tube may be readily adjusted relative to nozzle surface 25 and secured in position when the tube is properly centered within the nozzle opening with gap G being of substantially uniform thickness around the outlet end of the solute tube. It will also be noted that in the event the tapered surface 23 of the solute tube becomes worn so as to affect the flow geometry through the eductor-mixer, fasteners 31 may be loosened and solute tube 13 may be readily removed thereby to enable resurfacing of tapered surface 23 on the tube, or the solute tube may be moved farther into the housing thereby to accommodate the wear of the solute tube and/or the wear of nozzle surface 25. With fasteners 31 located in sleeve 11 clear of the nozzle member 19 and plenum 9, solvent flows through the plenum and the nozzle opening without encountering any resistance from the fasteners. It will also be noted that in its preferred embodiment, the nozzle opening or orifice through the eductor-mixer of the present invention is a continuous annular gap around the solute tube with no supports, flow dividers or other restrictions in the nozzle which would block or otherwise impede the flow of fluid therethrough. In this manner, the concentric solvent jet is a continuous annular jet as it is discharged from the nozzle. It will be understood, however, that flow dividers could be placed between the outer surface of the solute tube and the inner surface of the nozzle for supporting or centering the outer end of the solute tube in the nozzle opening. If this is done, the solvent jet discharged from the nozzle will not necessarily be a continuous annular jet, but rather would be a series of separate jets converging within the mixing chamber. These separate converging jets are considered to be within the scope of the present invention.

Working fluid inlet 5 is shown to have a coupler connection 33 thereon which enables a water hose or the like to be readily connected to the eductor. Solute inlet tube 13 has a tee 35 threaded thereon and the latter is adapted to have a hose 37 from the solute supply, such as from the discharge outlet of a fluidized container, readily connected thereto. Tee 35 has a so-called vacuum break valve 39 connected thereto. This vacuum break valve when closed blocks communication between the vacuum generated within mixing chamber 17 and within solute tube 13 and the atmosphere and when in its open positions opens communication between the vacuum and the atmosphere. When the vacuum break valve is open (it need not be fully open), air will flow into the mixing chamber through the vacuum break valve and the solute tube thereby to break or reduce the vacuum within the eductor which sucks the solute into the eductor-mixer from the solute supply and to thus decrease or terminate solute from being drawn into the eductor. Thus, by adjusting the vacuum break valve, the amount of solute drawn into the eductor-mixer via the solute tube may be readily controlled. A bleed valve (not shown) may be located elsewhere in solute feed line 37 for controlling solute feed (i.e., adjacent the solute supply), but a break valve should be located at the high point of solute feed for convenient starting and stopping of solute feed.

As heretofore mentioned, nozzle member 19 is a ring-like member and, as best shown in FIG. 3, has a shoulder 41 in its front face toward chamber 9 and an outwardly projecting flange 43. Shoulder 41 has a diameter substantially the same as the circular inner bore of housing 3 and thus the step is readily received within the open end of the housing so as to center the nozzle opening relative to the longitudinal center line of sleeve 11 and solute tube 13 inserted therein. Housing 3 and receiving tube 15 each have respective flanges 45 and 47 adapted to be sealingly secured together in face-to-face relation. With the receiving tube flange 47 in sealing engagement with nozzle flange 43, ring 19 is held captive in a desired position relative to the housing and the receiving member. A circumferential groove 49 is provided on the outer face of flange 47 for receiving an O-ring 51 which seals the receiving member to the housing. Flanges 45 and 47 each have sloped outer faces and are adapted to be drawn together by a sealing hoop clamp 53, such as is commercially available from the Aeroquip Company of Los Angeles, Calif. Upon tightening clamp 53 on flanges 45 and 47, these flanges are drawn into face-to-face sealing engagement with the O-ring 51. It will be understood, however, that means other than clamp 53 may be used for releasably and sealably securing the mixing tube 15 to housing 3. It will thus be appreciated that eductor 1 of this invention may readily be converted from one flow rate capacity to another merely by exchanging one nozzle ring 19 for another having different nozzle opening dimensions and exchanging receiving member 15 to maintain a desired ratio between nozzle area sand mixing chamber cross sectional area.

In accordance with this invention, the length L' of the conduit 26 is preferably about 5 to 50 times longer than its diameter D4, and even more preferably, is about 15 to 25 times longer than its diameter so as to enhance the mixing (i.e., dispersion) of the solute and the working fluid within the conduit. Expressed in another manner, the ratio L'/D4 preferably should range between about 5 and 50 and even more preferably between about 15 and 30. It will be understood, however, that this ratio could be varied considerably and even be outside the above-stated preferred ranges and still be within the scope of this invention. This ratio depends upon many factors, such as the physical characteristics of the solute and solvent being mixed, the flow rates and pressures, and temperatures of the solute and solvent, and many other factors. Thus, this ratio could vary considerably and satisfactory mixing of the solute and solvent could still be attained within the eductor-mixer system of this invention. The above-stated preferred ranges indicate ranges which for many materials have been readily and satisfactorily mixed by the apparatus of this invention.

In mixing powdered solutes with a liquid working fluid in an eductor-mixer system, it has been heretofore difficult to control the flow of airborne or fluidized powder solute to the eductor-mixer. In many prior applications, the flow of powdered solute was regulated by valves in the powder supply line. As heretofore mentioned, the vacuum break valve 39 (or a controllably throttled side stream from the atmosphere) serves to regulate the flow of powder to the eductor-mixer by controllably reducing or limiting the vacuum generated within the housing. Further in accordance with this invention, means, as generally indicated at 57 (see FIG. 4), is provided for bypassing a portion of the working fluid supplied under pressure to the eductor-mixer via inlet 5 around nozzle N thereby to decrease the vacuum generated within the eductor-mixer housing. This bypass means is shown to comprise a line 59 interconnected between the inlet 5 of housing 3 and receiving tube 15 downstream from nozzle N. A throttle valve 61 is provided in by-pass line 59 to control the flow of pressurized working fluid therethrough. Bypass line 59 is connected to mixing tube 15 in such manner that the pressurized working fluid discharged therefrom into the receiving tube does not act as a second nozzle jet creating a second stage for the eductor and thus generating additional vacuum, but rather enters the receiving tube in such direction, preferably at an angle of about 45° with respect to the centerline of discharge conduit 26 so as not to generate any appreciable vacuum within conduit 26 thereby to decrease the overall vacuum pumping of the solute at the upstream portion of mixing chamber 17 upstream from the outlet of bypass tube 59 into discharge conduit 26. As shown in FIG. 7, a manifold M surrounds discharge conduit 26. This manifold is in communication with line 59 and distributes the solvent to openings 60 in conduit 26 for generally 45° forward discharge into the conduit. By increasing the flow through bypass line 59 around the nozzle, the overall vacuum generated within the eductor-mixer is decreased by reducing working fluid flow through the nozzle, and the amount of solute drawn into the eductor-mixer system is thereby decreased.

Figure 5:
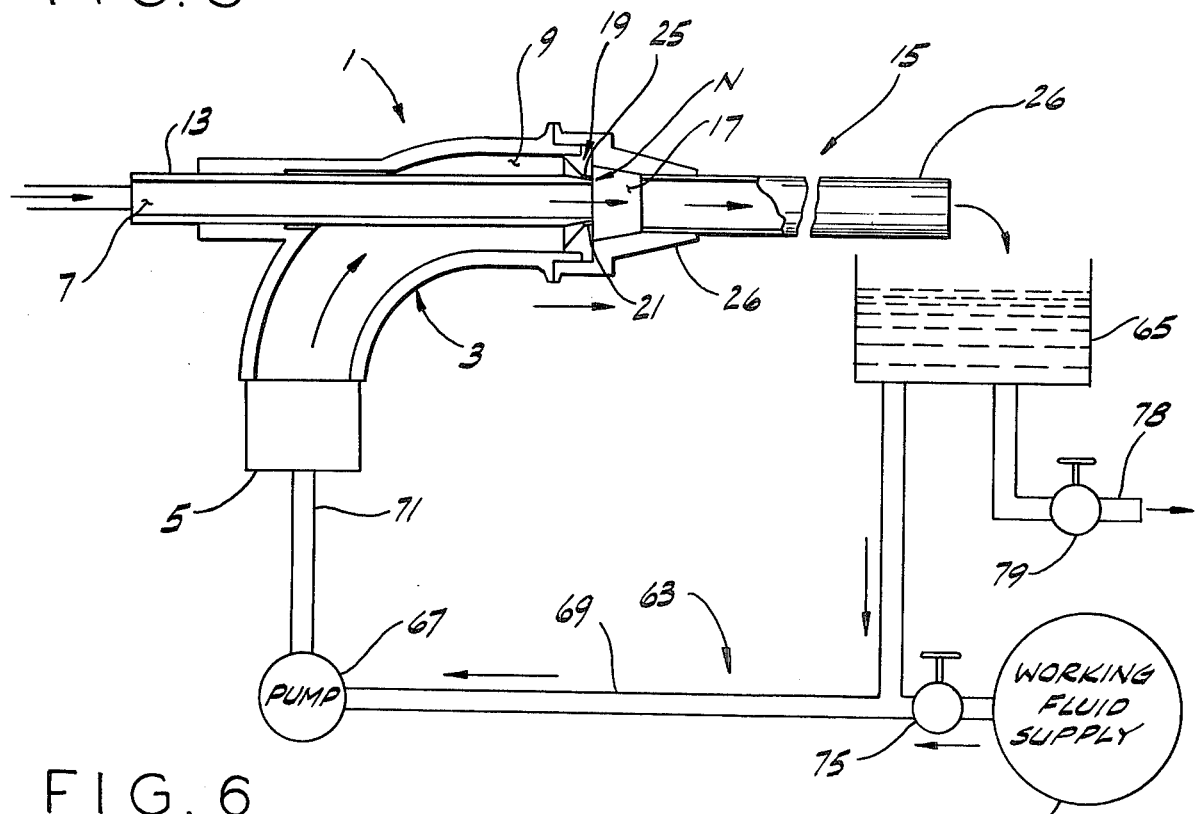
FIG. 5 is a semi-diagrammatic illustration of a method of and apparatus for recycling a portion of the mixed dispersion through the eductor-mixer thereby to shear the dispersion.

Further in accordance with this invention, eductor-mixer 1, as heretofore described, functions well to repeatedly shear the dispersion mixed thereby and to add additional solute so as to increase the concentration level of the solute in the dispersion over that which can be attained by a single pass through the eductor-mixer system. As shown in FIG. 5, an eductor-mixer system 1 of this invention is shown in a recycling mixing system, as is generally indicated at 63. Receiving tube 15 discharges into a reservoir 65 for holding the dispersion mixed by the eductor. The inlet of a pump 67 is connected to reservoir 65 by a line 69 and the outlet or discharge side of the pump is connected to inlet 5 of eductor-mixer system 1 by a line 71. A supply of solvent 73 is also connected to the inlet side of the pump, and a valve 75 is provided between inlet 5 and the source of working fluid to control the amount of solvent drawn from the solvent supply and supplied to the pump inlet and to inlet 5. Thus, pump 67 withdraws a portion of the dispersion from reservoir 65 and pumps it along with any desired amount of additional working fluid under pressure into plenum 9 of the eductor-mixer. The dispersion is then discharged through nozzle N into mixing chamber 17. Reservoir 65 has an outlet 78 through which the mixed slurry solution may be discharged via a valve 79. It is therefore seen that the recycling mixing system 63 of this invention constitutes means for withdrawing the dispersion discharged from receiving member 15, for returing the dispersion to plenum 9 under pressure, and for discharging the dispersion through nozzle N.

As theretofore mentioned, the fluid (i.e., working fluid and/or the recycled dispersion) is subject to shear as it flows through nozzle N. This fluid shearing action breaks up agglomerates and reduces the size of all dispersed solute particles flowing through the nozzle in a highly expeditious and efficient manner. As heretofore mentioned, the shear losses in this nozzle are minimized when nozzle surface 25 is a knife edged opening. If, however, it is desired that the fluid being circulated through the nozzle be subjected to shearing, the length of nozzle surface 25 in the direction of flow through the nozzle preferably should be made longer or the thickness of nozzle gap G should be made narrower. Thus, it is preferred that the ratio of the nozzle length L to the gap thickness G (i.e., L/G) be less than about 20 and preferably range between about 0.001 (for a knife edge nozzle surface) to about 10. Of course, by repeatedly recirculating slurry from the reservoir through the eductor-mixer nozzle, the slurry can be repeatedly sheared until the desired state is attained.

As heretofore mentioned, the eductor-mixer system 1 of this invention incorporated in recirculation or recycling system 63, in addition to functioning as an efficient one or multi-pass mixer, may be utilized to mix dispersions, slurries, or solutions having higher solute concentration levels than can normally be attained by one pass of the solvent and solute through the eductor-mixer system. The solvent is pumped under pressure through the eductor to positively draw the solute into the eductor-mixer via solute tube 13. The resulting mixture of solvent and solute, which is lower than desired concentration level, is discharged into holding reservoir 65. This low concentration mixture is withdrawn from reservoir 65 and is then pumped through the eductor-mixer so as to positively draw additional solute into the eductor-mixer system and to mix the solute with the mixture discharged from nozzle N into mixing chamber 15 to increase the solute concentration. The mixture from the reservoir may be repeatedly circulated through the eductor-mixer system so as to have additional solute mixed therewith until a desired concentration level is attained from the reservoir via line 78 and valve 79. Additional solvent from solvent supply 73 may be added to the mixture to maintain the desired concentration level and to maintain a desired quantity in the reservoir. Of course, the slurry may be continuously circulated through the eductor-mixer to repeatedly shear the slurry until it attains a desired state.

Figure 6:
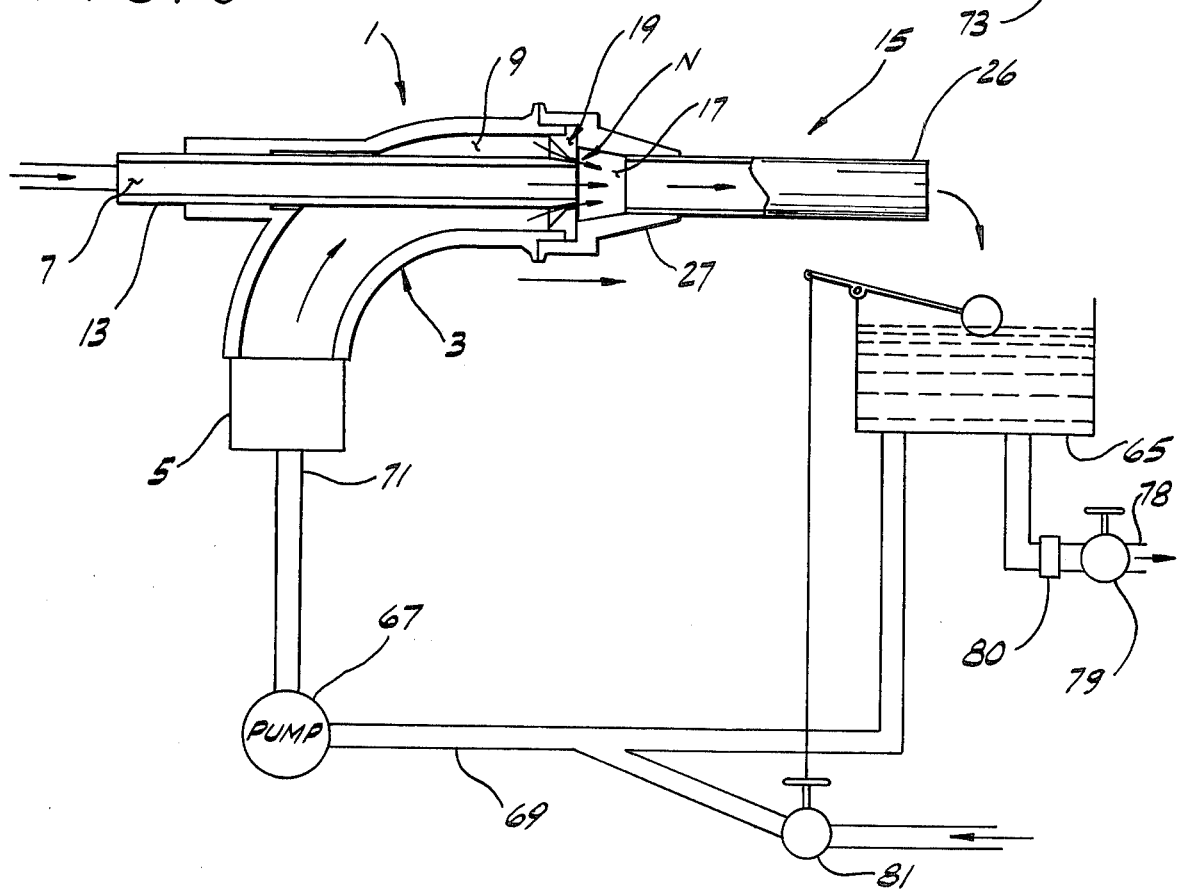
FIG. 6 is a semi-diagrammatic illustration of a modification of the apparatus shown in FIG. 5.

It will be understood, however, that in accordance with this invention, the mixing system may also be operated as a continuous mixing system. As shown in FIG. 6 recycling mixing system 63 may be provided with a valve 81, such as a float control valve or the like, responsive to the withdrawal of dispersion from reservoir 65 which permits pump 67 to draw additional solvent from the solvent supply and to pump it along with previously mixed dispersion through the eductor-mixer system 1 thereby to automatically draw additional solute into the eductor-mixer via solute tube 13. Product is withdrawn from reservoir 65 via a withdrawal valve 79, which may open and close in response to a signal from a concentration measuring device 80 (such as a density sensor) so as to deliver finished product at or above a desired concentration. All other hydraulic or other feedback controls (e.g., float valve 81) respond to this rate of withdrawal. Valve 81 is shown between the supply of working fluid or solvent and the inlet to pump 67 and is operable in response to a predetermined range of levels of the dispersion in the reservoir so as to supply additional working fluid to the pump inlet and to maintain the dispersion on the reservoir within its predetermined range of levels.

It will be appreciated that the system illustrated in FIG. 6 may be made fully automated by installing well-known instrumentation and controls in reservoir 65 and line 78 to monitor the quality (i.e., the density concentration level, or state of mixing or subdivision) of the product and to control operation of product withdrawal valve 79 in response to the quality of the product in reservoir 65. Product will be withdrawn so long as the product meets the desired specifications. Withdrawal of product from reservoir 65 causes the level of the product to drop thereby actuating float control valve 81 so as to supply additional working fluid to eductor 1. The additional working fluid will decrease the concentration level of solute in the dispersion. If the concentration level or other reused properties of the product, as sensed by sensor 80, fall below preestablished levels, valve 79 will be automatically closed or proportionately throttled to maintain the properties of the dispersion at the desired levels.

Figure 4:
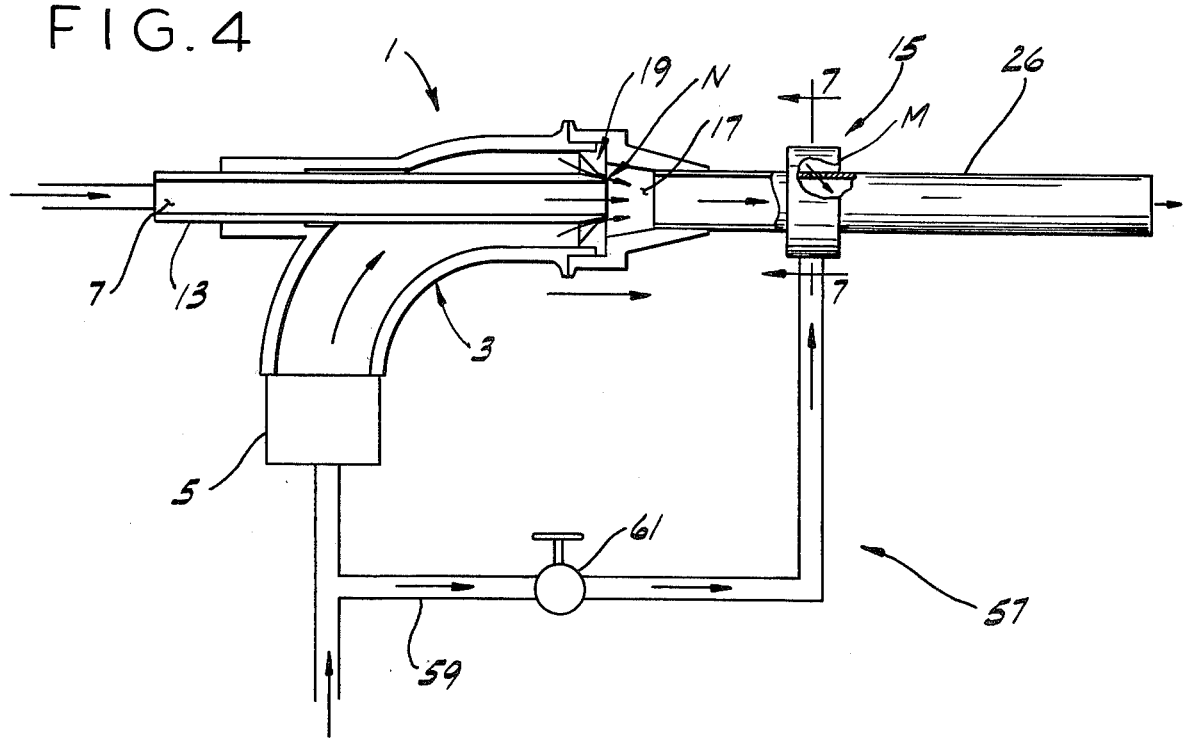
FIG. 4 is a semi-diagrammatic illustration of a method of and system for bypassing a portion of the working fluid supplied to the eductor-mixer so as to regulate the flow of solute into the eductor-mixer.

In FIGS. 4–6, eductor-mixer 1 is shown with its receiving member 15 horizontal, but it is to be understood that in operation the outlet end of the mixing tube may be preferably pointed at a downward angle of 15°–90° so as to prevent solvent from entering the solute tube when the eductor-mixer is not in operation.

As the dispersion is recirculated through nozzle N, fluid shear subdivides the solute particles, agglomerates or masses. Upon the working fluid along with any dispersion in plenum 9 being ejected from the nozzle at high velocity, the working fluid (including any recycled dispersion) cavitates in the vacuum within mixing chamber 17 to form a multiplicity of droplets thus vastly increasing the surface for contact with solid liquid or gaseous solute. These droplets are widely dispersed in the mixing chamber and violently collide with solute drawn into the mixing chamber and with other droplets so as to enhance mixing. It is to be understood that in accordance with this invention the shear and impact dispersion may be substantially independently varied so as to more readily attain a desired state of the resulting slurry. More specifically by holding the flow area of nozzle N constant, but by varying the thickness of the nozzle gap G with appropriate adjustments in plenum pressure, shear may be controlled. Impact dispersion, on the other hand, may be varied by varying the flow velocity through the nozzle as by varying the pressure within plenum 9 with appropriate reduction of gap thickness to deemphasize them.

Since the liquid jet J flowing through nozzle N cavitates upon entering mixing chamber 17 thus producing a multiplicity of liquid droplets having a large surface area when compared to the volume of the liquid, a stream of gaseous solute, such as air or oxygen supplied via solute tube 13, may be readily drawn into the mixing chamber whereby the gaseous solute is brought into intimate contact with the liquid particles for being readily dissolved therein to form a liquid solution approaching saturation. In this manner, apparatus 1 of this invention may be used to carry out a gas dissolving process, such as oxygenation or aeration processes, in a highly efficient manner. By recirculating the liquid solution through the eductor-mixer and by adding more gaseous solute on each pass relatively high concentrations of a gaseous solute in the manner heretofore described may be readily dissolved in a liquid solvent.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An eductor-mixer system comprising:

an eductor body having a curved passage extending therethrough for flow of a pressurized working fluid from one end of the passage, constituting an inlet end, to the other end of the passage, constituting a discharge end, said passage being generally of uniform circular cross-section throughout its length;

said body having an opening therein opposite said discharge end of the passage, said opening being coaxial with said discharge end and of substantially smaller diameter than the diameter of said passage;

a nozzle member comprising a ring separate from the body having inside and outside faces and a central opening therethrough from its inside to its outside face, said ring being removably mounted in place at the discharge end of said passage coaxial with said discharge end, said central opening in the ring being of substantially smaller diameter than the diameter of said passage;

a cylindrical tube of substantially smaller diameter than the diameter of said passage extending from outside said body through said opening in the body opposite the discharge end of the passage and extending forward in said passage from the inner end of said opening in the body into the central opening in the ring, said tube being open at its end in said central opening in the ring, said open end of the tube constituting a discharge end;

said tube being axially adjustable in and removable from said opening;

said tube being adapted for connection of its end outside the body to a source of fluent material to be educted and mixed with said working fluid for flow of said material through said tube and out of the discharge end of the tube;

the discharge end of the tube being substantially flush with the outside face of said ring;

the tube being exteriorly tapered at its said discharge end and thereby having an exterior conical surface convergent in the direction toward its said discharge end with the angle of taper with respect to the axis of the tube less than about 30°;

the inner periphery of the ring bounding the central opening in the ring being formed as a conical nozzle surface extending from the inside face to the outside face of the ring and convergent in downstream direction from the inside to the outside face of the ring;

said conical nozzle surface of the ring surrounding and being spaced from said exterior conical surface of the tube a distance which is small relative to the diameter of the outer end of said conical nozzle surface, thereby providing an annular conical orifice between the exterior conical surface of the tube and said conical nozzle surface of the ring for delivery of the pressurized working fluid from said passage through said orifice in the form of a hollow conical jet converging in downstream direction from the outside face of the ring;

the gap between the exterior conical surface of the tube and the conical nozzle surface of the ring being relatively small and the length of said orifice being relatively short for rapid acceleration of working fluid flowing through the orifice to a relatively high lineal velocity with low flow losses;

and means separate from the ring providing a passage downstream from said ring at the discharge end of the passage in said body in which the material issuing from the discharge end of the tube and the working fluid conically jetted through said orifice may mix;

said passage means being removably secured to said body at the discharge end of the passage in the body extending outwardly from said ring and having an internal diameter at its end at the outside face of said ring larger than the diameter of said conical nozzle surface of the ring at the outside face of the ring and the internal surface of said passage means lying outward of and wholly clear of the projection of said conical jet throughout the length of the jet.

2. An eductor-mixer system as set forth in claim 1 wherein said ring has a flange engaging the end of said body at the discharge end of said passage, and said passage means comprises a discharge conduit and a transition section between the ring and said conduit, said transition section engaging said ring and holding it in place in the discharge end of said passage, and wherein means is provided removably securing said transition section to said body, said transition section having a tapered bore convergent in downstream direction away from the ring, the diameter of the bore at the outside face of the ring being larger than the diameter of said conical nozzle surface of the ring at the outside face of the ring.

3. An eductor-mixer system as set forth in claim 1 further comprising a valve in communication with said tube and with a source of gas, such as the atmosphere, said valve being operable between a closed position in which it blocks communication between said tube and said gas source and an open position in which it opens communication therebetween.

4. An eductor-mixer system as set forth in claim 1 wherein said eductor body is in the form of an elbow and has an integral elongate sleeve extending out from the bend of the elbow coaxial with the discharge end of the passage in the body, the sleeve defining said opening for the tube, the tube extending axially through the sleeve, and wherein there is provided means releasably securing said tube in the sleeve and adjustable for centering the tube in the sleeve, said securing means being releasable for axial adjustment of the tube, and a seal between the tube and the sleeve.

5. An eductor-mixer system as set forth in claim 4 wherein:
said ring has a peripheral flange engaging the end of the elbow at the discharge end of the passage;
said passage means comprises a discharge conduit and a transition section between the ring and said conduit, said transition section engaging said ring and holding it in place in the discharge end of said passage;
means is provided removably securing said transition section to the elbow; and
said transition section has a tapered bore convergent in downstream direction away from the ring, the diameter of the bore at the outside face of the ring being larger than the diameter of said conical nozzle surface of the ring at the outer face of the ring.

6. An eductor-mixer system as set forth in claim 5 further comprising a valve in communication with said tube and with a source of gas, such as the atmosphere, said valve being operable between a closed position in which it blocks communication between said tube and said gas source and an open position in which it opens communication therebetween.

* * * * *